(12) United States Patent
Hanna et al.

(10) Patent No.: US 9,827,954 B2
(45) Date of Patent: Nov. 28, 2017

(54) RELEASE MECHANISM FOR A PARKING BRAKE CLUTCH

(75) Inventors: Ronald J. Hanna, Mancelona, MI (US); Adam W. Remesz, Clinton Township, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 1940 days.

(21) Appl. No.: 11/831,123

(22) Filed: Jul. 31, 2007

(65) Prior Publication Data

US 2008/0041689 A1 Feb. 21, 2008

Related U.S. Application Data

(60) Provisional application No. 60/822,788, filed on Aug. 18, 2006.

(51) Int. Cl.
| | | |
|---|---|---|
| B60T 7/06 | (2006.01) |
| F16D 41/064 | (2006.01) |
| G05G 1/44 | (2008.04) |
| G05G 5/00 | (2006.01) |
| B60T 7/04 | (2006.01) |

(52) U.S. Cl.
CPC ............... B60T 7/06 (2013.01); B60T 7/045 (2013.01); F16D 41/064 (2013.01); G05G 1/44 (2013.01); G05G 5/00 (2013.01); Y10T 74/20528 (2015.01)

(58) Field of Classification Search
CPC . B60T 7/06; B60T 7/065; B60T 7/045; B60T 7/104; F16D 41/064; Y10T 74/20528; G05G 1/44; G05G 5/00; G05G 5/12; G05G 5/26

USPC .. 192/219.4, 219.6, 219.7, 12 B, 14, 16, 38, 192/44, 45, 291.6; 74/539, 542, 512–514, 74/560; 188/82.1, 82.8, 82.84, 82.3, 188/82.34

See application file for complete search history.

(56) References Cited

U.S. PATENT DOCUMENTS

| | | | | |
|---|---|---|---|---|
| 1,330,986 A * | 2/1920 | Rice | ............................... | 74/513 |
| 2,727,603 A * | 12/1955 | Rauen | ....................... | 192/219.3 |
| 2,881,637 A * | 4/1959 | Hinsey | ............................ | 74/531 |
| 2,884,805 A * | 5/1959 | Krause | ............................ | 74/531 |
| 2,915,916 A * | 12/1959 | Fender et al. | .................. | 74/531 |
| 3,236,121 A * | 2/1966 | Gdowik et al. | ................. | 74/531 |
| 3,476,226 A * | 11/1969 | Massey | .......................... | 192/27 |
| 3,648,813 A * | 3/1972 | Walters et al. | .......... | 192/70.252 |
| 4,175,404 A * | 11/1979 | Schopf | ....................... | F16D 1/06 403/359.6 |
| 4,431,101 A * | 2/1984 | Limbacher | ............... | 192/70.252 |
| 4,497,395 A * | 2/1985 | Nogami et al. | ................. | 477/93 |
| 5,275,261 A * | 1/1994 | Vranish | ........................ | 188/82.2 |
| 5,309,788 A | 5/1994 | Pare et al. | | |
| 5,533,420 A | 7/1996 | Perish | | |

(Continued)

*Primary Examiner* — Terry Chau
(74) *Attorney, Agent, or Firm* — Robert E. Ford; Steven L. Crane; Raymond J. Vivacqua

(57) ABSTRACT

A parking brake assembly which includes a brake lever, a rotary clutch and a lock-release mechanism which cooperate to selectively lock and release a parking brake. The clutch allows actuation of the brake lever in one direction and prevents movement of the brake lever in an opposite direction. The lock-release mechanism allows selective movement of the rotary clutch and the brake lever together in the opposite direction. A gear mechanism is operatively coupled between the brake lever and the rotary clutch.

15 Claims, 6 Drawing Sheets

(56) References Cited

U.S. PATENT DOCUMENTS

| | | | |
|---|---|---|---|
| 5,794,492 A | 8/1998 | Pare' | |
| 8,025,129 B2* | 9/2011 | Gresley | 188/2 D |
| 2008/0041185 A1* | 2/2008 | Hanna et al. | 74/512 |
| 2010/0072017 A1* | 3/2010 | Joki et al. | 192/44 |

* cited by examiner

RELEASE MECHANISM FOR A PARKING BRAKE CLUTCH

FIELD OF THE INVENTION

The invention relates to parking brake assemblies for motor vehicles. More particularly, the invention relates to a lock-release mechanism for selectively releasing a clutch of a parking brake mechanism.

BACKGROUND OF THE INVENTION

Generally, parking brake assemblies for automobiles, among other things, include a lock-release mechanism made up of a sector gear and lock pawl which cooperate to provide a ratcheting type directional locking of the parking brake and an actuator to disengage the lock pawl from the gear sector to release the parking brake or a helical spring. Examples of parking brakes can be found in U.S. Pat. Nos. 4,850,242; 5,309,786; 5,881,605; 5,001,942; 5,448,928; 5,211,072; 5,875,688; 5,182,963; 5,588,335; 5,832,784; 5,533,420; 6,662,676, the disclosures of which are herein incorporated by reference.

One of the issues with conventional parking brake systems is that they do not package equally across multiple car platforms. There is, therefore, a need in the art for a parking brake assembly that has improved packaging with sufficient performance such that the system can be more readily adapted across multiple vehicle platforms.

Another issue with conventional brakes is brake lever travel loss. Brake lever travel loss is a term generally understood in the art. Essentially, brake lever travel loss results in the necessity of over applying a parking brake. As such there is a need in the art for a parking brake assembly that has reduced brake lever travel loss.

SUMMARY OF THE INVENTION(S)

According to one aspect of the invention, a parking brake assembly is provided for a motor vehicle, which includes a brake lever, a controlled member, a roller clutch, a lock-release mechanism and a gear mechanism. The brake lever is pivotally coupled to a fixed support for rotation about a first pivot. The controlled member is pivotally coupled to the fixed support for movement about a second pivot spaced apart from the first pivot. The roller clutch has a roller support supporting the controlled member. The roller clutch has at least one unidirectional roller disposed between the roller support and the controlled member allowing unidirectional movement of the controlled member relative to the roller support. The roller support is movable relative to the fixed support for movement of the roller support and the controlled member together in a direction opposite the unidirectional movement. The lock-release mechanism has a block selectively movable between a locked position operatively engaging the fixed and roller supports to prevent rotation of the roller support relative to the fixed support and an unlocked position disengaged from the roller support to allow rotation of the roller support and controlled member together in the direction opposite the unidirectional movement. The gear mechanism is operative coupled between the controlled member and the brake lever. The gear mechanism has a pinion coupled to one of the controlled member and the brake lever and a sector coupled to the other of die one of the controlled member and the brake lever. The pinion and the sector are mechanically engaged for transferring movement between the controlled member and the brake lever.

According to another aspect of the invention, a parking brake assembly is provided for a motor vehicle, which includes a brake lever, a roller clutch and a lock-release mechanism. The roller clutch is operatively connected to the brake lever by a gear mechanism and allowing unidirectional movement of the brake lever, the roller clutch having a roller support. The lock-release mechanism releasably fixes movement of the roller support using a force that is non-normal to a torque load applied to the roller clutch.

According to another aspect of the invention, a parking brake assembly for a motor vehicle includes a brake lever, a roller clutch and a lock-release mechanism. The roller clutch is operatively connected to the brake lever by a gear mechanism and allows pivotal movement of the brake lever in a first direction and prevents pivotal movement of the brake lever in an opposite second direction. The roller clutch is supported by a roller support that is movable together with the roller clutch in the second direction. The lock-release mechanism is movable between a locked position to prevent movement of the roller support in the second direction and an unlocked position to allow movement of the roller support in the second direction.

DETAILED DESCRIPTION OF PREFERRED EMBODIMENTS

Figure 1:
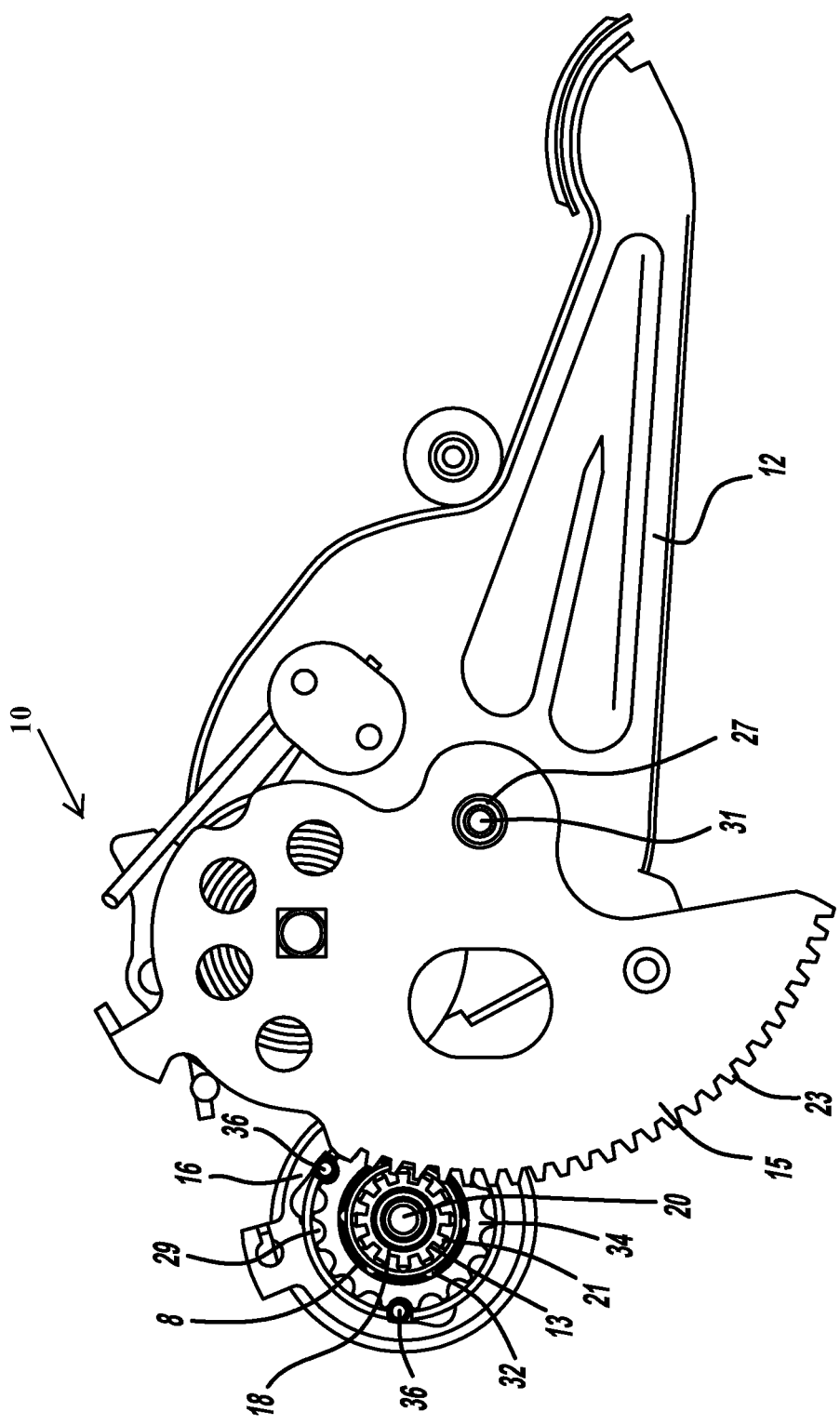
FIG. 1 is a side view of a parking brake assembly according to one embodiment of the invention, shown in a released position.
Figure 2:
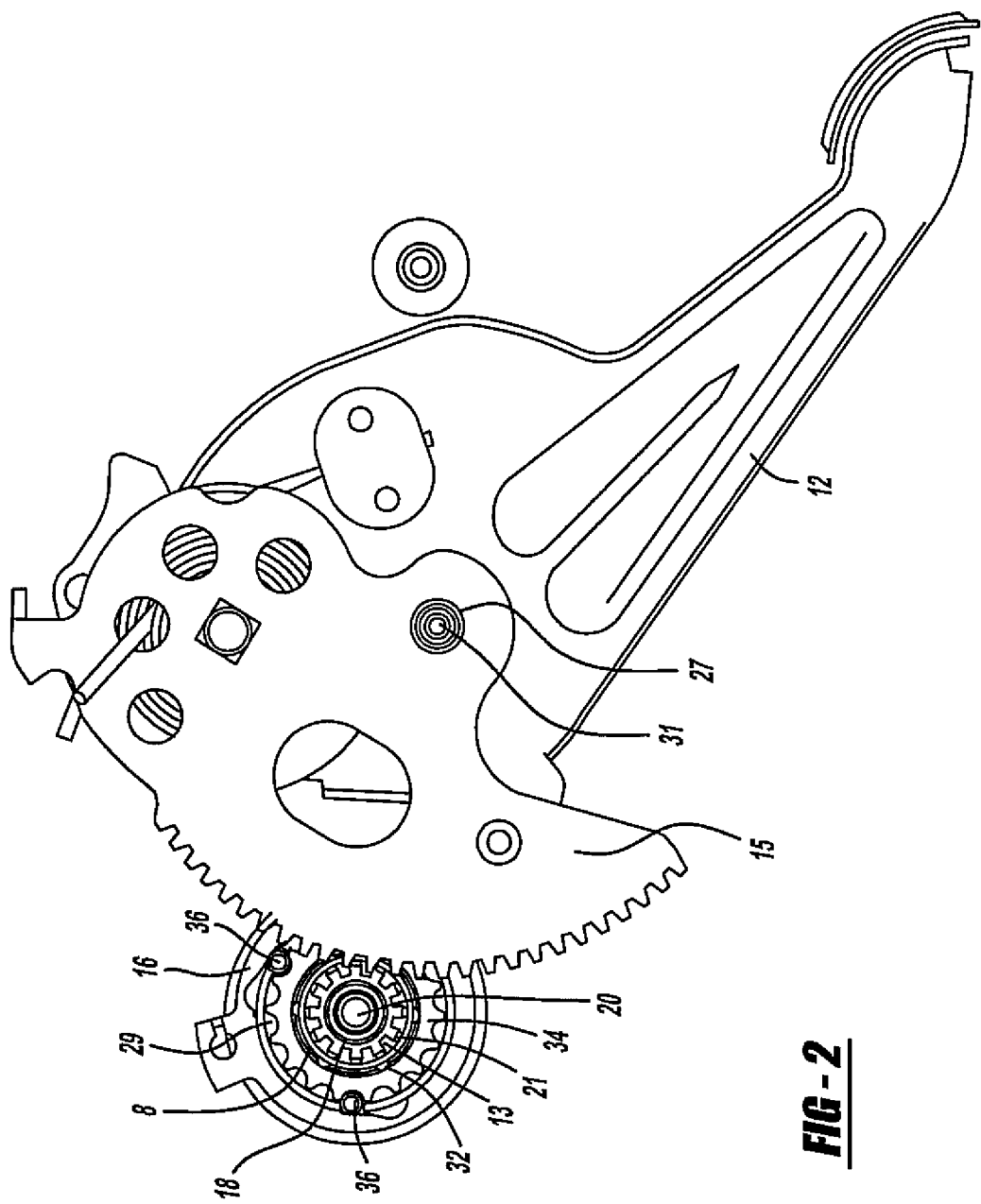
FIG. 2 is a side view of the parking brake assembly, shown in an actuated position.
Figure 3:
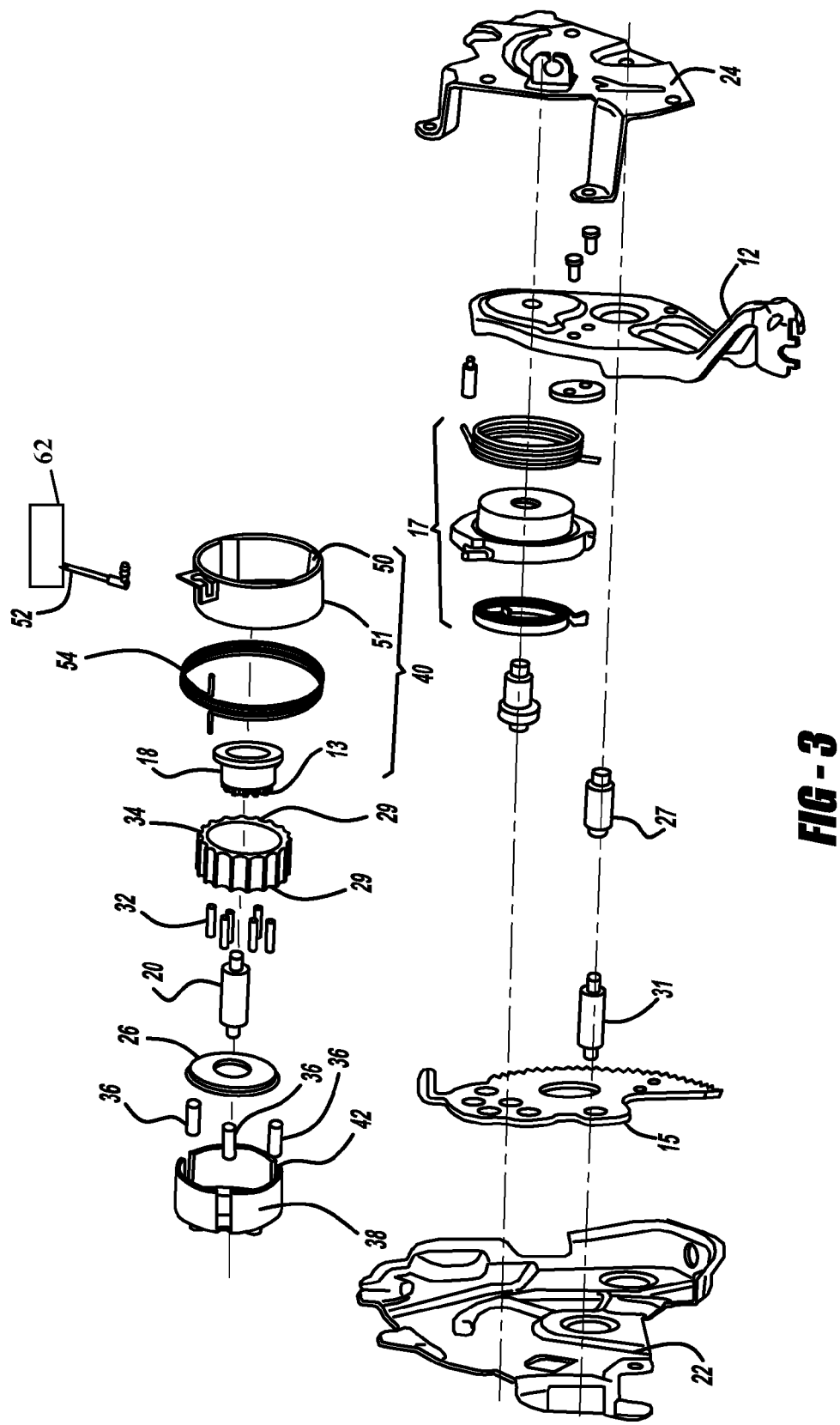
FIG. 3 is an exploded perspective view of the parking brake assembly.

Referring to FIGS. 1-3, a parking brake assembly is generally indicated at 10. The parking brake assembly 10 includes a lever 12, a rotary clutch 8 coupled with the lever 12 and a lock-release mechanism 16 coupled with the clutch 8. Described in greater detail below, the parking brake assembly 10 includes a gear mechanism having a pinion 13 and a sector 15 operative between the clutch 8 and the lever 12 to allow the lever 12 to be moved from a released position to an actuated position, locked in the actuated position, and selectively unlocked from the actuated position and returned to the released position.

The parking brake assembly 10 may be any suitable brake actuation device, such as a pedal type, hand type, electronic type, push to release, pull to release, self adjust or cable type parking brake actuator. Illustratively, the parking brake assembly 10 is shown as a pedal type brake actuation device utilizing a foot-actuated lever 12. If the parking brake assembly 10 is used for a cable-driven parking brake system, then the lever 12 may be coupled to a cable via a cable connector or, as shown, the cable may be connected to the lever 12 by a cable tensioning mechanism 17. The lever 12 may be movably or pivotally supported in the system in any suitable manner. In the illustrated embodiment, the lever 12 is fixedly secured to a sleeve 27 that is, in turn, pivotally coupled to a pivot shaft 31 having ends fixedly connected to supports 22, 24. By this arrangement, the lever 12 moves together with the sleeve 27 about the pivot shaft 31.

In the illustrated embodiments, the clutch 8 is provided as a roller clutch. An advantage of a roller clutch 8 is that the roller clutch 8 can allow precise, smooth or non-ratcheting movement of a controlled member in a first direction, while preventing rotary movement of the controlled member in an opposite second direction. The roller clutch 8 includes a roller support 34 with one or more roller members 32. The roller members 32 may be positioned between any suitable surface of the roller support 34 and a bearing surface of an adjacent member to be controlled, such as a pivot sleeve 18 shown in FIGS. 3-5. The pivot sleeve 18 is pivotally coupled to a second pivot shaft 20 with ends fixedly secured to the supports 22, 24. In the illustrated embodiment, the roller members 32 are disposed between the outer cylindrical surface 19 of the pivot sleeve 18 and an inside circumferential surface 33 of the roller support 34. In one embodiment, the roller members 32 may be engagable with notches (not shown) formed along the inside circumferential surface 33 of the roller support 34. The notches allow the roller members 32 to rotate in the first direction to allow rotation of the pivot sleeve 18 relative to the roller support 34 and wedge or lock to prevent rotation of the pivot sleeve 18 relative to the roller support 34 in the second direction. In this case, springs (not shown) may be used to bias the roller members 32 out of the wedged or locked state.

The pinion 13 is coupled to the pivot sleeve 18 for movement generally therewith. Illustratively, the pinion 13 is fixedly secured to or alternatively integral with the pivot sleeve 18 for movement therewith about the second pivot shaft 20. The pinion 13 has teeth 21 that are mechanically engaged with teeth 23 on the sector 15, so that the rotation of the lever 12 about the pivot shaft 31 is controlled by the clutch 8 and lock-release mechanism 16. Mechanically engaged means that the teeth 21, 23 of the pinion 13 and sector 15 may be directly engaged or, alternatively, one or more gears may be provided between the pinion 13 and the sector 15 to achieve, for example, increased or reduced pedal effort and/or for packaging purposes. The clutch 8 allows for rotation of the pivot sleeve 18 and, in turn, the pinion 13 in a first direction (such as when the lever 12 and sector 15 are moved by a user to engage the parking brake assembly 10) and prevents return movement of the pivot sleeve 18, pinion 13 and lever 12 in an opposite second direction.

To permit movement of the pivot sleeve 18, pinion 13 and lever 12 in the second direction, the clutch 8 may be used in combination with a lock-release mechanism 16. As such, a rotary clutch 8 in combination with a lock-release mechanism 16 allows unidirectional movement of the pivot sleeve 18 (or some other controlled member) when the lock-release mechanism 16 is engaged, and rotation of the clutch 8 (i.e. parts of the clutch, such as the clutch support 34 or the entire clutch) in an opposite direction when the lock-release mechanism 16 is disengaged. A preferred rotary clutch 8 and lock-release mechanism 16 permits primary cable travel loss of 1 mm or less. In one aspect the primary cable travel loss may be less than 0.5 mm and in another aspect less than 0.15 mm.

In general, the lock-release mechanism 16 may be any suitable engagement/disengagement member or device for locking and releasing a controlled member. The lock-release mechanism 16 may be manually or power actuated. It should be appreciated that a controlled member can be any of, one or more, temporarily constrained element(s), such as a pinion, housing, support, pivot, link, shaft, adapter, adapter for attachment to a roller clutch, a roller support, etc. In the present embodiment, the controlled member is the clutch 8.

The lock-release mechanism 16 includes a block 36 engagable with any one of a plurality of notches 29 on the outer circumference 35 of the roller support 34. In FIG. 3, the blocks 36 are provided as cylindrically shaped pins, though any suitable shape for the block 36 may be used which allows movement of the block 36 between locked and unlocked position, as described further below.

The lock-release mechanism 16 also includes a guide member 38 for locating and movably supporting the block 36. The guide member 38 may be any suitable position fixing device, such as a bearing, block, strap, flange, housing, etc. The guide member 38 in the illustrated embodiment is a bell housing with a flange adapted for attaching the guide member 38 to a suitable support in the vehicle, such as the pedal box or brackets. The guide member 38 may be attached to a suitable support by any suitable means, including welding, rivets, bolts, screws, adhesives, etc. The guide member 38 preferably has a bearing surface 39. In the illustrated embodiment, the bearing surface 39 is generally cylindrical. The guide member 38 preferably includes a check 42 for allowing location of the block 36. The check 42 in this example is in the form of a pass-through slot in the guide member 38. While three slots 42 are shown in the pictured embodiment of FIG. 3, it should be realized that any number of slots 42 may be utilized, depending generally on the requirements of a specific application. The slots 42, are illustratively equally spaced circumferentially about the circumference of the guide member 38.

Figure 6:
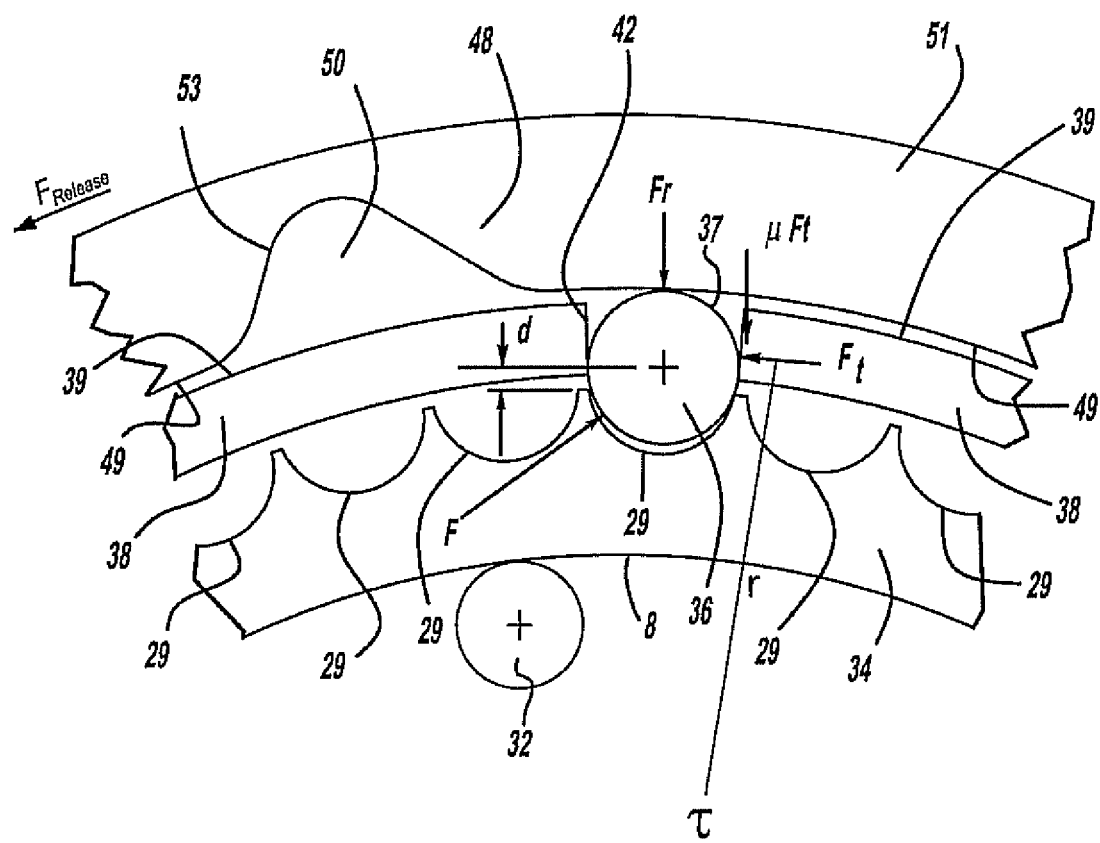
FIG. 6 is an enlarged partial view of the clutch and lock-release mechanism, shown in the locked position and illustrating the forces involved in actuating the clutch and lock-release mechanism between the locked and unlocked positions.

The lock-release mechanism 16 also includes an actuator 40. The actuator 40 may be any suitable actuating member or device for engaging and disengaging the lock-release mechanism 16 and may be manually actuated or powered. In generally, the actuator 40 engages the block 36 with a force vector or force that is non-normal to a torque load applied to some controlled member (e.g. the clutch 8). By applying the force to the block 36 at an angle that is non-normal to the torque load applied to the controlled member, the force required by the actuator 40 to engage the block 36 can be reduced. Referring to FIG. 6, the force $F_{Release}$ needed to initiate the actuator may be generally seen as a component of the radial force Fr multiplied by the coefficient of friction μ. The force Fr is a function of the force F of the block 36 in relation to the controlled member 8 and the distance d from the center of the block 36 to the controlled member 8. The force Fr needed to keep the block 36 in place will be a function of the torque ($\tau$) applied to the controlled member 8, Ft. The force Fr may be reduced as the angle between Ft and F is reduced. The angle may be reduced in any suitable manner. The angle is preferably reduced by using one or more curved bearing surfaces. As such, the block 36 may include a curved bearing surface 37 or the actuator 40 may have a curved or angled bearing surface 53 or both. The one or more bearing surface(s) 37, 53 are preferably curved or angled such that when a torque ($\tau$) is applied to some controlled member 8 (either directly or through a pivot) the force transferred by the controlled member 8 acts on the actuator 40 through the block 36. By having an angle of contact between the actuator 40 and that of a block 36 that is non-normal to the torque load applied to the controlled member 8, the force needed to actuate the lock-release mechanism 16 can be reduced.

The actuator 40 preferably has an adjuster 48 for moving the block 36 in and out of engagement with the notches 29 in file roller support 34. The adjuster 48 may be in any suitable form, such as a cam, detent, surface relief, hole, mound, etc. In the illustrated embodiment, the adjuster 48 is an annular member or ring 51 having a bearing surface 49 for contacting the block 36 and retaining the block 36 engaged with one of the notches 29 to lock the roller support 34 relative to the ring 51. A recess or relief 50 is formed along the bearing surface 49 and is sized to receive at least a portion of the block 36 therein. The relief 50 includes an arched bearing surface 53 spaced radially relative to the bearing surface 49.

Figure 4:
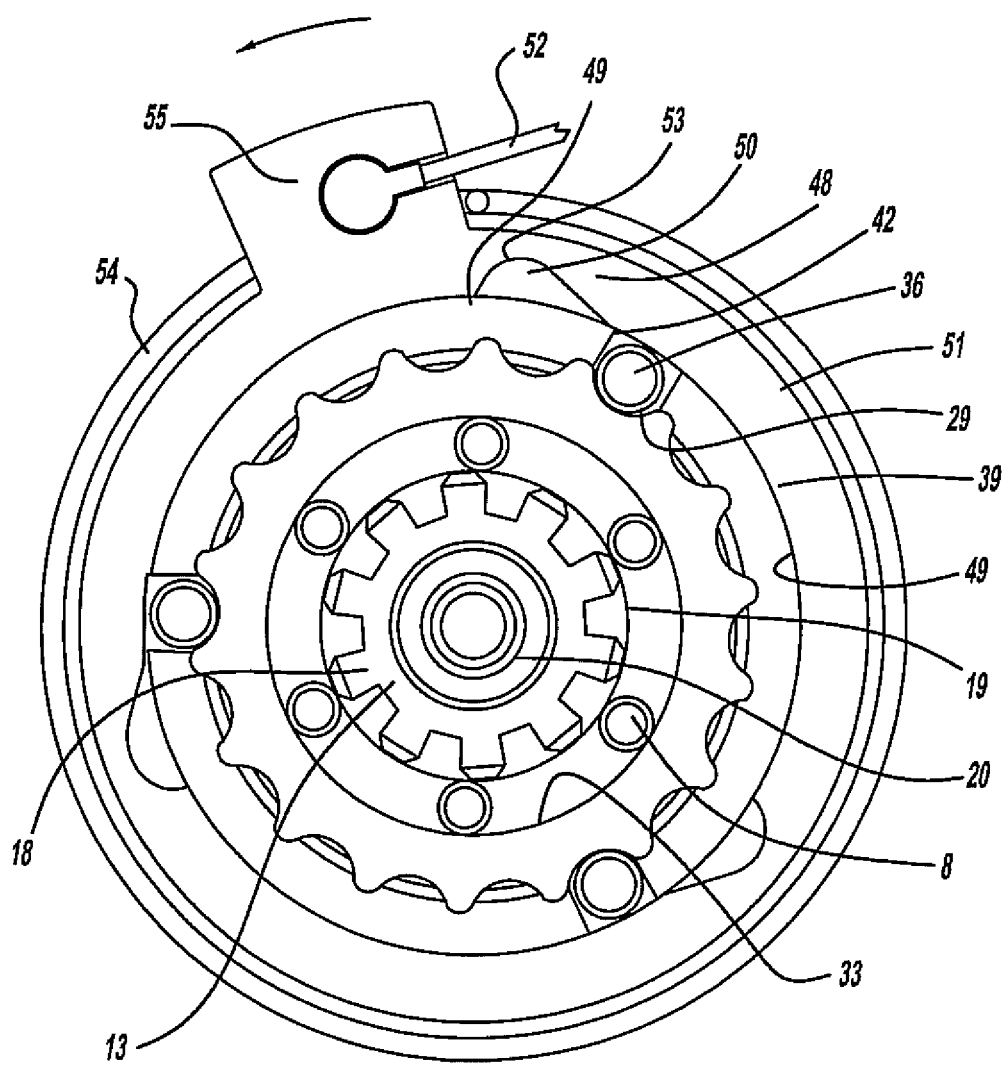
FIG. 4 is a side view of the clutch and lock-release mechanism, shown in a locked position
Figure 5:
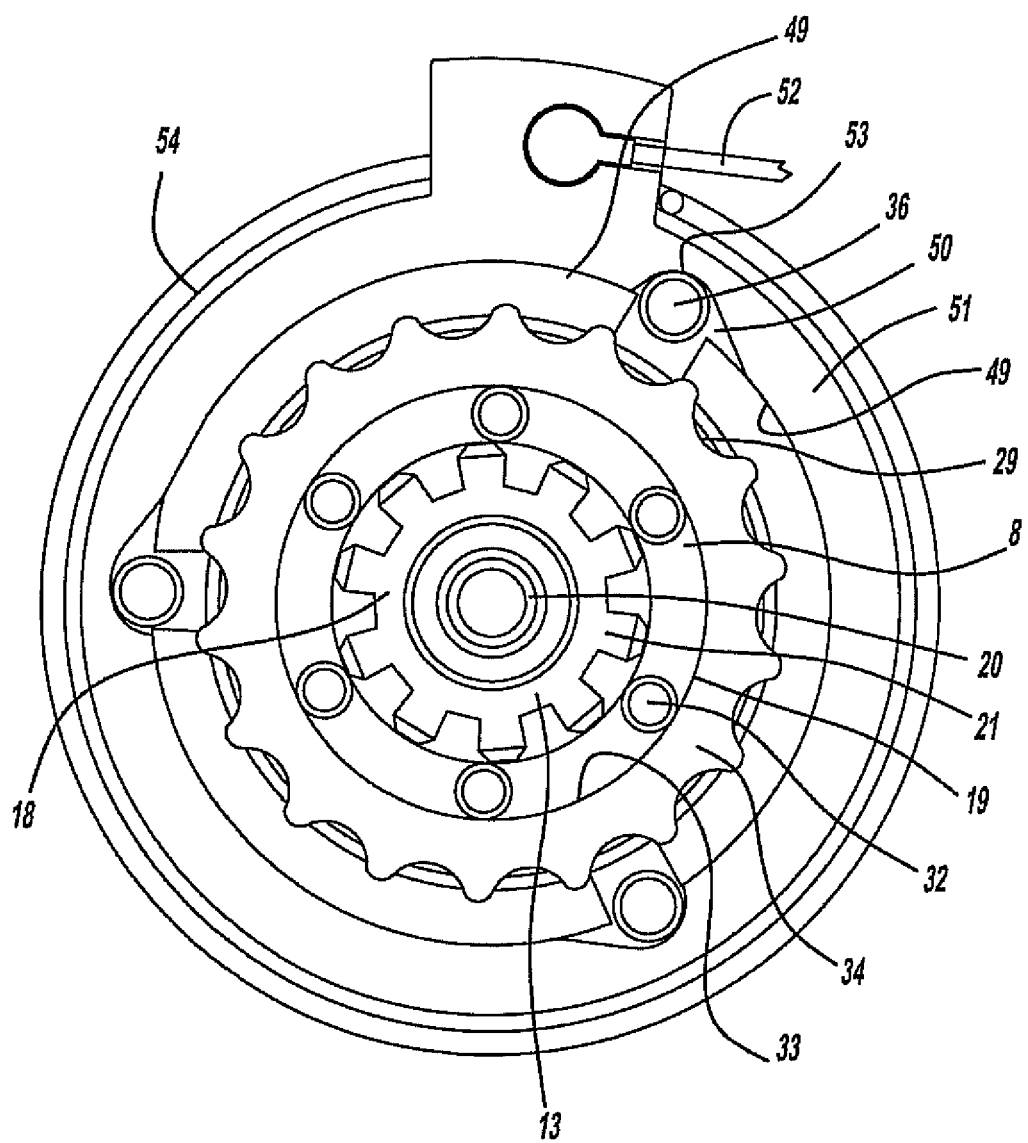
FIG. 5 is a side view of the clutch and lock-release mechanism, shown in an unlocked position.

The ring 51 allows selective engagement and retention of the block 36 with the notches 29 in the roller support 34 by rotation of the ring 51 in one direction toward a locked position, as shown in FIG. 4, and disengagement of the block 36 from the notches 29 by rotation of the ring 51 in an opposite direction toward an unlocked position, as shown in FIG. 5. More specifically, in the locked position, the block 36 is disposed in the slot 42 and partially extends beyond the guide member 38 into a corresponding notch 29 of roller support 34, thereby preventing rotation of the roller support 34 relative to the guide member 38. Any forces tending to displace the block 36 from the corresponding notch 29 are resisted by immediate contact of the block 36 with the bearing surface 49. The engaging force delivered by the actuator 40 to the block 36 is preferably delivered at a vector non-normal to the torque load applied to the roller support 34. In the case of a parking brake assembly with a roller clutch 8 coaxially connected to the pivot sleeve 18, a vector non-normal to the torque load applied to the roller support 34 is a force load applied by the pivot sleeve 18.

To release the controlled member 8, the ring 51 is rotated to the unlocked position, wherein the relief 50 in the bearing surface 49 is substantially rotatably aligned with the slot 42 and the block 36 disposed in the slot 42. The block 36 is then radially displaceable from the notch 29 into the relief 50. Rotation of the roller support 34 causes displacement of the block 36 out of the notch 29 and into the relief 50 in the ring 51. The roller support 34 becomes freely rotatable relative to the guide member 38 once the block 36 is fully displaced from the notch 29.

In FIGS. 3-5, the actuating mechanism is shown illustratively to include a cable 52 adapted to be coupled to a receiver 55 on the adjuster ring 51. The cable 52 can be pulled to move the ring 51 to the unlocked position. The cable 52 may be pulled manually or by powered actuators 62, such as solenoids, linear actuators, rods, cables, springs, magnets, etc. Alternatively, a powered actuator may be directly coupled to the adjuster 48 for locking and unlocking the lock-release mechanism 16.

The lock-release mechanism 16 may also include a biasing member 54 to bias the actuator 40 in one or more directions, such as toward the locked position. As illustrated, the biasing member 54 biases the ring 51 of the actuator 40 toward the locked position (indicated by the arrow in FIGS. 4 and 5). Thus, the ring 51 may be actuated toward the unlocked position by overcoming the biasing force applied by the biasing member 54.

In use, particularly when the lock-release mechanism 16 is used with a roller clutch 8 in a parking brake 10, a user may actuate the parking brake 10 by moving the lever 12 from a released position, shown in FIG. 1, toward any one of a plurality of actuated positions, shown illustratively in FIG. 2. As the parking brake 10 is actuated, the sector 15 rotates with the lever 12 about the pivot shaft 31. Rotation of the sector 15 causes corresponding rotation of the pivot sleeve 18 due to the meshing of the gear teeth 21, 23 of the pinion 13 and sector 15. The rollers 32 of the roller clutch 8 allow rotation of the pivot sleeve 18 in one direction relative to the locked and fixed roller support 34, but prevent back motion of the pivot sleeve 18 in the opposite direction.

To release the lever 12, the user can pull the cable 52 to move the ring 51 from the locked position, as shown in FIG. 4, toward the unlocked position, as shown in FIG. 5. In the unlocked position, the relief 50 is generally aligned with an associated block 36 to allow the block 36 to move out of fixing engagement with one of the notches 29 in the roller support 34, thereby allowing the roller clutch 8 and pivot sleeve 18 to rotate together and return the lever 12 to the released and resting position shown by the solid lines in FIG. 1. The lever 12 may be returned to the released and resting position by a conventional lever biasing member (not shown).

While the invention has been illustrated in detail in the drawings and the foregoing description, the same is to be considered as illustrative and not restrictive in character. For example, changes to shapes and relative positions of the various elements can be made with little effort with only slight or no modifications to the description hereof. For non-limiting illustration purposes, it should be understood that the relative shape of the controlled member and block arrangement could be reversed. In such an arrangement the actuator could be positioned within the controlled member with the adjusters of the actuator pointing radially out instead of in and the notches of the controlled member disposed along an inner circumference and open toward the actuator. Therefore, it should be understood that only the preferred embodiments have been shown and described fully and that all changes and modifications that come within the spirit and scope of the invention are desired to be protected.

What is claimed is:

1. A parking brake assembly for a motor vehicle, said parking brake assembly comprising:
    a brake lever having a sector;
    a pivot sleeve coupled to the brake lever and having gear teeth formed on an end of the pivot sleeve that are in mesh with the sector;
    a roller clutch having a roller support operatively connected to the pivot sleeve by a roller disposed between the pivot sleeve and a bearing surface of the roller support and the roller clutch preventing movement of the pivot sleeve relative to the roller support in a first direction and the roller support movable in a direction opposite the first direction when a lock-release mechanism is moved to an unlocked position; and
    wherein the lock-release mechanism releasably fixes movement of the roller support using a force that is non-normal to a torque load applied to the roller clutch.

2. The parking brake assembly of claim 1, wherein the lock-release mechanism includes one or more notches formed in the roller support for receiving a movable block.

3. The parking brake assembly of claim 2, wherein the lock-release mechanism includes a ring having a bearing surface for maintaining the block in the notch and a recess formed in the bearing surface for receiving at least a portion of the block while disengaged from the notch.

4. The parking brake assembly as set forth in claim 3, wherein the ring is selectively movable between a locked position, in which the bearing surface retains the block in the notch of the roller support, and the unlocked position, in which the recess is generally aligned with the notch to allow movement of the block between the notch and the recess such that the block is not in the notch when the ring is in the unlocked position and the roller support is rotating.

5. A parking brake assembly for a motor vehicle, said parking brake assembly comprising:

a brake lever connected to a sector;

a roller clutch including at least one roller, the roller clutch intermeshed with the sector of the brake lever and allowing pivotal movement of the brake lever in a first direction and preventing pivotal movement of the brake lever in an opposite second direction, the roller clutch being supported by a roller support that is movable together with the roller clutch in the first direction when a lock-release mechanism is moved to an unlocked position; and the lock-release mechanism including a block movable between a locked position to prevent movement of the roller support in the first direction and the unlocked position to allow movement of the roller support in the first direction, the roller support including one or more notches formed thereon;

wherein the lock-release mechanism includes a ring having a bearing surface maintaining the block in the notch and a recess formed in the bearing surface receiving the block while disengaged from the notch such that the block is not in the one or more notches when disengaged.

6. A parking brake assembly for a motor vehicle, said parking brake assembly comprising:

a brake lever pivotally coupled to a fixed support for rotation about a first pivot;

a member to be controlled pivotally coupled to the fixed support for movement about a second pivot spaced apart from the first pivot;

a roller clutch having a roller support supporting the member to be controlled, the roller clutch having at least one roller disposed between the roller support and the member to be controlled allowing movement in a first direction of the member to be controlled relative to the roller support, the roller support being movable relative to the fixed support for movement of the roller support and the member to be controlled together in a direction opposite the first direction, the roller support including a notch;

a lock-release mechanism having a block including a circumferential bearing surface, the block selectively movable between a locked position operatively engaging the fixed support and roller support to prevent rotation of the roller support relative to the fixed support, wherein at least a portion of the block is positioned in the notch and wherein the notch engages the circumferential bearing surface to lock the roller support with respect to the fixed support and an unlocked position disengaged from the roller support to allow rotation of the roller support and member to be controlled together in the direction opposite the first direction;

a gear mechanism operative between the member to be controlled and the brake lever, the gear mechanism having a pinion coupled to one of the member to be controlled and the brake lever and a sector coupled to the other of the one of the member to be controlled and the brake lever, the pinion and the sector being mechanically engaged for transferring movement between the member to be controlled and the brake lever; and an adjuster movably coupled to the fixed support and actuating the block between engagement and disengagement with the notch in response to the movement of the adjuster relative to the fixed support.

7. The parking brake assembly as set forth in claim 6, wherein the adjuster includes a bearing surface that contacts the circumferential bearing surface and maintains the block in the notch of the roller support.

8. The parking brake assembly as set forth in claim 7, wherein the bearing surface of the adjuster contacts the circumferential bearing surface of the block with a force that is non-normal to a torque load applied to the member to be controlled.

9. The parking brake assembly as set forth in claim 7, wherein the adjuster includes a recess formed along the bearing surface of the adjuster, the recess receiving at least a portion of the block therein while the block is disengaged from the notches in the roller support.

10. The parking brake assembly as set forth in claim 9 including a guide member fixed in relation to the fixed support, the guide member having a slot allowing movement of the block therethrough between the notch in the roller support and the recess.

11. The parking brake assembly as set forth in claim 9, wherein the guide member is disposed between the roller support and the adjuster and the slot in the guide member allows generally radial movement of the block between the notch and the recess.

12. The parking brake assembly as set forth in claim 9, wherein the adjuster is a ring rotatably coupled to the fixed support for movement between the locked position, wherein the recess is rotatably spaced apart from the block and the bearing surface is engaged with the circumferential bearing surface to retain the block in the notch of the roller support, and the unlocked position, wherein the recess is generally rotatably aligned with the notch to allow movement of the block between the notch and the recess.

13. The parking brake assembly as set forth in claim 12 including a biasing member for biasing the ring toward the locked position.

14. The parking brake assembly as set forth in claim 12 including a powered actuator for actuating the adjuster between the locked and unlocked positions.

15. The parking brake assembly as set forth in claim 6, wherein the block is selected from the group consisting of: a cylindrically shaped pin, and a ball.

* * * * *